United States Patent
Sidlyarevich

(10) Patent No.: US 10,410,767 B2
(45) Date of Patent: Sep. 10, 2019

(54) COMBINED POWER AND COMMUNICATIONS CABLE

(71) Applicant: Rockwell Automation Technologies, Inc., Mayfield Heights, OH (US)

(72) Inventor: Timothy P. Sidlyarevich, Rogers, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/173,352

(22) Filed: Oct. 29, 2018

(65) Prior Publication Data

US 2019/0066872 A1    Feb. 28, 2019

Related U.S. Application Data

(63) Continuation of application No. 15/364,970, filed on Nov. 30, 2016, now Pat. No. 10,147,521.

(51) Int. Cl.
| | |
|---|---|
| *H01B 9/00* | (2006.01) |
| *H02K 11/33* | (2016.01) |
| *H01B 3/30* | (2006.01) |
| *H02K 11/21* | (2016.01) |
| *H01B 7/04* | (2006.01) |
| *H02K 11/25* | (2016.01) |

(52) U.S. Cl.
CPC .............. *H01B 9/003* (2013.01); *H01B 3/30* (2013.01); *H02K 11/21* (2016.01); *H02K 11/33* (2016.01); *H01B 7/04* (2013.01); *H02K 11/25* (2016.01)

(58) Field of Classification Search
CPC . H01B 9/003; H01B 3/30; H01B 7/04; H02K 11/21; H02K 11/33; H02K 11/25
See application file for complete search history.

(56) References Cited

U.S. PATENT DOCUMENTS

| | | |
|---|---|---|
| 2,180,731 A | 11/1939 | Dickinson |
| 3,023,267 A | 2/1962 | Rubinstein et al. |

(Continued)

FOREIGN PATENT DOCUMENTS

EP    1057192    12/2000

OTHER PUBLICATIONS

Heidenhain, "Encoders for Servo Drives," Nov. 2008, 208 922-29-40—Nov. 2008, Printed in Germany (76 pages).

(Continued)

*Primary Examiner* — Emily P Pham
(74) *Attorney, Agent, or Firm* — Boyle Fredrickson, S.C.

(57) ABSTRACT

Aspects of the present invention provide an improved cable having a reduced cross section while continuing to provide high voltage (noisy) power signals alongside low voltage (noise-susceptible) data signals. The improved cable can be used for power delivery and communications between a motor and a drive in an industrial control system. The reduced cross section advantageously improves handling. By providing separate groups between a group delivering the power signals and a group providing the data signals, thereby enforcing a physical separation, and by twisting together individual conductors of the group delivering the power signals with the group providing the data signals and the groups providing the separation, the reduced cross section can be achieved while continuing to minimize noise and interference onto the data signals due to the power signals.

20 Claims, 4 Drawing Sheets

(56) References Cited

U.S. PATENT DOCUMENTS

| | | | |
|---|---|---|---|
| 4,156,869 A | 5/1979 | Schukantz | |
| 4,527,247 A | 7/1985 | Kaiser et al. | |
| 4,742,475 A | 5/1988 | Kaiser et al. | |
| 4,916,642 A | 4/1990 | Kaiser et al. | |
| 4,994,986 A | 2/1991 | Cihiwsky et al. | |
| 5,444,184 A | 8/1995 | Hassel | |
| 5,491,299 A | 2/1996 | Naylor et al. | |
| 5,530,203 A | 6/1996 | Adams et al. | |
| 5,574,250 A | 11/1996 | Hardie et al. | |
| 5,834,698 A | 11/1998 | Izui et al. | |
| 5,976,070 A | 11/1999 | Ono et al. | |
| 6,249,913 B1 | 6/2001 | Galipeau et al. | |
| 6,362,432 B1 | 3/2002 | LaPidus et al. | |
| 6,434,512 B1 | 8/2002 | Discenzo | |
| 6,448,500 B1 | 9/2002 | Hosaka et al. | |
| 6,507,165 B2 | 1/2003 | Kato et al. | |
| 6,757,665 B1 | 6/2004 | Unsworth et al. | |
| 6,929,396 B2 | 8/2005 | Gramsamer et al. | |
| 7,208,684 B2 | 4/2007 | Fetterolf, Sr. et al. | |
| 7,304,241 B2 | 12/2007 | Trieb | |
| 7,389,278 B2 | 6/2008 | Unsworth et al. | |
| 7,592,549 B2 | 9/2009 | Seufert et al. | |
| 7,595,647 B2 | 9/2009 | Kroh et al. | |
| 7,740,501 B2 | 6/2010 | Ballard et al. | |
| 8,247,695 B2 | 8/2012 | Nakamura et al. | |
| 8,525,029 B2 | 9/2013 | Kato et al. | |
| 8,976,541 B2 | 3/2015 | Ballard | |
| 9,018,529 B2 | 4/2015 | Sidlyarevich | |
| 2001/0033146 A1 | 10/2001 | Kato et al. | |
| 2003/0121694 A1 | 7/2003 | Grogl et al. | |
| 2003/0171827 A1 | 9/2003 | Keyes, IV et al. | |
| 2004/0199480 A1 | 10/2004 | Unsworth et al. | |
| 2006/0142875 A1 | 6/2006 | Keyes, IV et al. | |
| 2007/0074891 A1 | 4/2007 | Burke | |
| 2007/0102188 A1 | 5/2007 | Glew | |
| 2007/0110376 A1 | 5/2007 | Buthe et al. | |
| 2007/0289635 A1 | 12/2007 | Ghazarian et al. | |
| 2009/0062931 A1 | 3/2009 | Keyes, IV et al. | |
| 2009/0160387 A1 | 6/2009 | Terorde Gerd | |
| 2010/0072931 A1 | 3/2010 | Bodner et al. | |
| 2012/0178287 A1 | 7/2012 | Mantay et al. | |
| 2014/0102755 A1 | 4/2014 | Adriaenssens | |
| 2015/0096785 A1* | 4/2015 | Hayashishita | H01B 3/445 174/113 R |
| 2015/0144377 A1* | 5/2015 | Fausz | H01B 11/04 174/116 |
| 2017/0149406 A1 | 5/2017 | Spiel | |
| 2018/0191513 A1 | 7/2018 | Hess et al. | |

OTHER PUBLICATIONS

Leoni Kabel GmbH & Co. KG, Zweigniederlassung Bretzfeld, Claus Schaffroth, Telefax, Feb. 26, 2004 16:26 (1 page).

Tecni Kabel, Specifica Generale di costruzione, No. 17590, Cavo Per Utilizzo in Posa Fissa Approvato UL e CAS, Sep. 26, 2004, Rev.1 Jul. 29, 2004 (3 pages).

Houston Wire & Cable, Vicki Wicihowski, Jan. 23, 2006 14:39 Fax, Belden Wire & Cable Company, Product Code Q979439, Technical Data Sheet, Jan. 20, 2006 Rev. 0 (12 pages).

IGUS; Plastics for Longer Life; retreived from website on Nov. 30, 2016 http://www.igus.com/wpck/4828/testedservocable?C=US&L=en; (3 pages).

Direct Industry; motion plastics: If it moves . . . igus improves; retrieved from website on Nov. 30, 2016 http://www.directindustry.com/prod/igus/product-4740-597851.html; (32 pages).

EE World Online Resource; Single, hybrid cable for servomotors available with bus element; retrieved from website on Nov. 30, 2016 http://www.wireandcabletips.com/single-hydrid-cable-servomotors-available-bus-element/; (7 pages).

EE Times; Harting: Hybrid Profinet cabling simplifies installation; retrieved from website on Nov. 30, 2016 http://www.eetimes.com/document.asp?doc_id=1270318; (3 pages).

Oki Electric Cable Co., Ltd.; ORM Cable Series (#0461) (UL20276); retrieved from website on Nov. 30, 2016 http://www.okidensen.co.jp/en/prod/cable/robot/orm0461.html; (3 pages).

Oki Electric Cable Co., Ltd.; ORM Cable Series (#0460) (UL20276); retrieved from website on Nov. 30, 2016 http://www.okidensen.co.jp/en/prod/cable/robot/orm0460.html; (3 pages).

* cited by examiner

COMBINED POWER AND COMMUNICATIONS CABLE

CROSS-REFERENCE TO RELATED APPLICATION(S)

This application is a continuation of U.S. patent application Ser. No. 15/364,970, filed on. Nov. 30, 2016, entitled "Combined Power and Communications Cable," which is incorporated herein by reference.

BACKGROUND OF THE INVENTION

The present invention relates to combined power and communications cables and, in particular, to combined power and communications cabling for use in industrial control systems.

Industrial controllers are specialized computer systems used for the control of industrial processes or machinery, for example, in a factory environment. Industrial controllers typically control numerous modules via specialized control networks for accomplishing different tasks in the industrial system. One such module may be a variable frequency drive ("VFD") unit, which, in turn, may deliver power to, communicate with and/or control a motor. In industrial applications, motors may be used to affect a variety of motions in the industrial process. For example, motors may be operated at continuous or variable speeds, such as for turning the blades of a fan or the rollers of an assembly line at constant or variable speeds at different times, or may be used to precisely control the position of objects and machines, such as precisely controlling the movement of a robotic arm or the opening and closing of a door.

Drive units typically have access to a power source and utilize a transistor network to deliver high voltage three phase electric power to a motor. Motors typically receive power from the drive unit and in turn feed the power through electrical windings which surround a motor core with one or more magnets, thereby electromagnetically powering the motor. Delivery of such power to the motor typically requires transmission of significant amounts of power and energy, which is inherently a source of electrical interference and noise. As such, drive units typically deliver such power via dedicated power cables to minimize electromagnetic interference ("EMI").

Drive units also typically provide data communication and control over the motor. Such data communication may be bi-directional between the drive unit and the motor. For example, drive units may send communications to the motor to turn the motor on, adjust the position, adjust the direction, adjust the speed, or apply a brake, such as during an emergency. Drive units may also receive communications from the motor, such as for measuring the precise position of the motor, speed (revolutions per minute), temperature, or run-time.

Motors typically include encoders which may precisely measure (or sense) the position of the motor or which may communicate with one or more other intelligent sensors or devices integrated with the motor, such as a temperature sensor or timer. The encoders may communicate such information to the drive unit. Encoders may communicate information via one or more digital data signals over a transmission line, which may be for example a single-ended line or a differential pair.

Communication transmission lines typically involve low voltage electrical signals that are susceptible to electrical interference and noise, which may thereby cause signal integrity loss and resulting data loss. Consequently, drive units often communicate with motors via dedicated communications cables.

Many implementations require multiple cables for separate power delivery and communications, thereby increasing the cost and complexity of the designs by automatically doubling the number of cables and connectors that are required. U.S. Pat. No. 9,018,529, assigned to the present assignee, describes an approach in which power and communications conductors are combined in a single cable while minimizing one or more of the aforementioned drawbacks. It is now desired to further improve the aforementioned combined cable.

SUMMARY OF THE INVENTION

Aspects of the present invention provide an improved cable having a reduced cross section while continuing to provide high voltage (noisy) power signals alongside low voltage (noise-susceptible) data signals. The improved cable can be used for power delivery and communications between a motor and a drive in an industrial control system. The reduced cross section advantageously improves handling. By providing separate groups between a group delivering the power signals and a group providing the data signals, thereby enforcing a physical separation, and by twisting together individual conductors of the group delivering the power signals with the group providing the data signals and the groups providing the separation, the reduced cross section can be achieved while continuing to minimize noise and interference onto the data signals due to the power signals.

Larger cable cross sections can present several drawbacks, such as: smaller bend radius; increased manufacturing costs for additional material usage; increased complexity for connectors; limited availability for connectors; limited availability of compatible units; and/or increased distortion of data signals. Moreover, by placing a communication link in a same core and under a same electrical braid as noisy power delivery conductors (which may be used, for example, to connect switching Insulated-Gate Bipolar Transistors ("IGBT's") for motor stator windings), the communication links can be increasingly susceptible to signal distortion. Consequently, achieving good noise rejection with a reduced cable cross section is desirable.

As described herein, the present invention may provide an improved cable configuration by strategically placing conductors within a single cable to minimize crosstalk between high voltage, noisy power lines and low voltage communication subassembly, while achieving a smallest core footprint possible. Aspects of the invention can include electrical shielding, jacketing, and/or use of fillers to further reduce electrical interference. Locating three power delivery conductors close together along an edge of an electrical screen can allow for controlled field concentration within a cable core. A communication subassembly can then be located away from the concentrated field area in a quietest area of the cable. Power delivery conductors can utilize insulation material with a low dielectric constant for low capacitive coupling to minimize voltage spikes at stator windings in a drive and to minimize cable losses which can cause heating of the drive.

In one aspect, the cable can provide power delivery conductors alongside subassemblies which can include a communications subassembly and an optional motor control brake subassembly. The motor control brake subassembly could consist of, for example, two or more insulated conductors which could be twisted around a common center. Aluminized tape can optionally be applied to provide an electrical screen. Copper braid can be applied over the twisted pair to provide the electrical screen as well as safe separation of a low voltage circuit from a high voltage circuit.

The communications subassembly can consist of two insulated conductors twisted around a common center and covered by insulation of a low dielectric constant to achieve low delay, high impedance and minimum signal distortion. Filler can be used in valleys of the twisted pair for added distance between conductors and a braided shield and to substantially maintain a round geometric shape. Tape wrap can also be used over both conductors and a filler to create a uniform core along the length of a cable. Aluminized tape can be optionally applied to provide electrical screen for high frequency noise. Copper braid can be applied over the twisted pair to provide an electrical screen as well as safe separation of a low voltage circuit from a high voltage circuit. A jacket or tape can be used around the electrical braid for insulation and added support.

The communications subassembly can be separated from the power delivery conductors by separation groups on opposing sides. One separation group could be the motor control brake subassembly. Another separation group could be a protective ground signal. The power delivery conductors, the communications subassembly and the separation groups can be twisted together around a common center which could be a solid filler having a rounded cross-section, a fibrillated filler and/or a pliable filler and can have a low dielectric. The twisted together groups can then be covered by one or more of a core wrap, an electrical screen or tape (such as aluminized tape), an electrical shield (such as a braided copper shield), a low friction tape (which can serve as a flex assist), and an extruded cable jacket.

Specifically then, one aspect of the present invention can provide a combined power and communications cable including: first, second and third insulated conductors for delivering three phase electric power, the first, second and third insulated conductors forming a first group; fourth and fifth insulated conductors for providing data communication, the fourth and fifth insulated conductors being twisted together and covered by an electrical shield, the fourth and fifth insulated conductors forming a second group; and third and fourth groups having rounded insulated cross-sections. The second group can be placed between the third and fourth groups, and the third and fourth groups can each be placed between the first and second groups around a common center. Also, the first, second, third and fourth groups can be twisted together around the common center and covered by an electrical shield.

Another aspect can provide a method for combining power and communications in a cable including: providing first, second and third insulated conductors for delivering three phase electric power, the first, second and third insulated conductors forming a first group; twisting together fourth and fifth insulated conductors for providing data communication and covering the fourth and fifth insulated conductors in an electrical shield, the fourth and fifth insulated conductors forming a second group; providing third and fourth groups having rounded insulated cross-sections; placing the second group between the third and fourth groups and the third and fourth groups each between the first and second groups around a common center; and twisting together the first, second, third and fourth groups around the common center and covering the first, second, third and fourth groups in an electrical shield.

Another aspect can provide an industrial control system including: a motor powered by three phase electric power and having an encoder; a drive unit for delivering three phase electric power to the motor and for communicating with the encoder; and a combined power and communications cable coupling the motor and the drive unit including: first, second and third insulated conductors for delivering the three phase electric power, the first, second and third insulated conductors forming a first group; fourth and fifth insulated conductors for providing data communication between the motor and the drive unit, the fourth and fifth insulated conductors being twisted together and covered by an electrical shield, the fourth and fifth insulated conductors forming a second group; and third and fourth groups having rounded insulated cross-sections. The second group can be placed between the third and fourth groups, and the third and fourth groups can each be placed between the first and second groups around a common center. The first, second, third and fourth groups can be twisted together around the common center and covered by an electrical shield.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
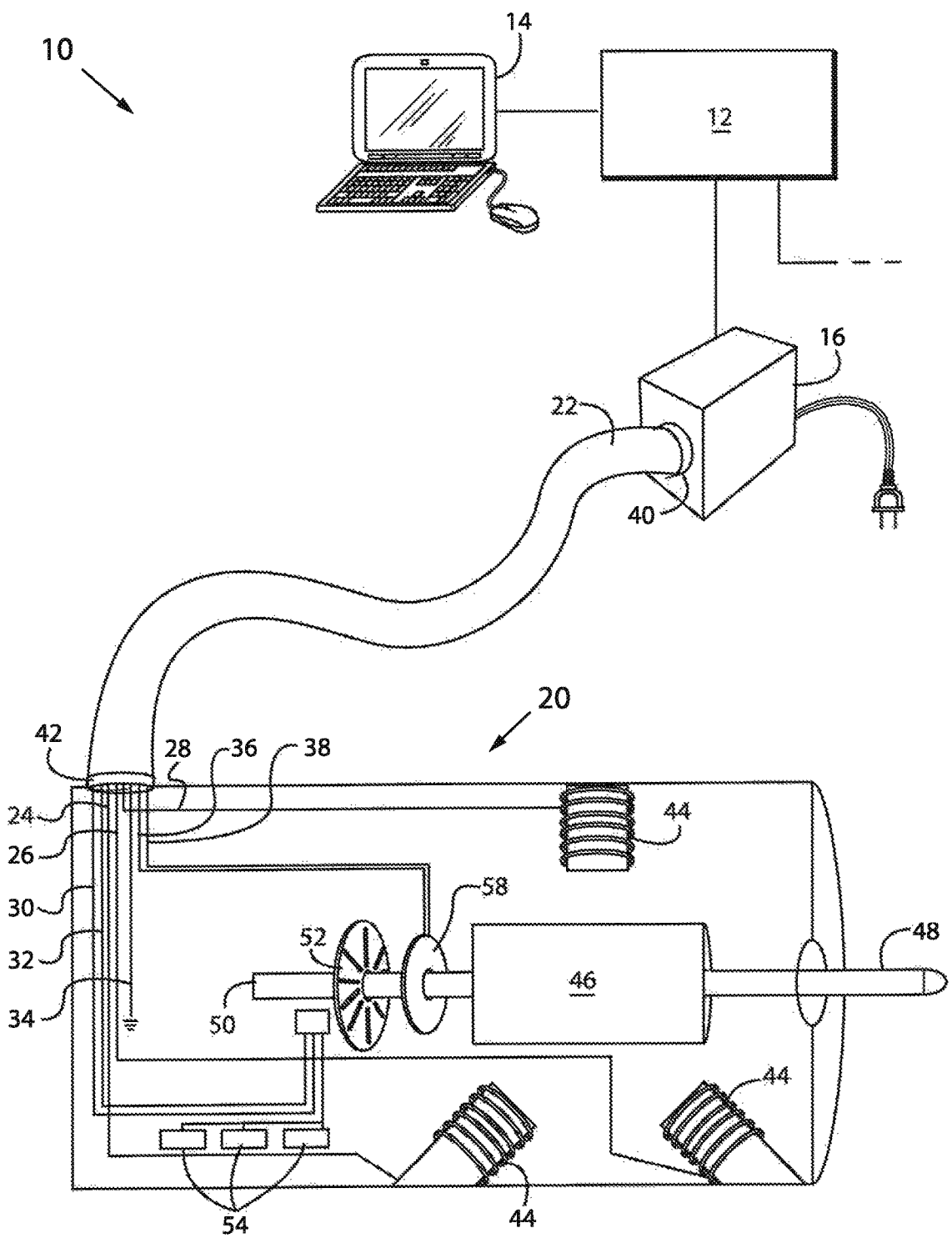
FIG. 1 is a diagram of an exemplar industrial control system with a combined power and communications cable for use with a motor and a drive unit in accordance with an aspect of the invention.

Referring now to the drawings wherein like reference numbers correspond to similar components throughout the several views and, specifically, referring to FIG. 1, the present invention shall be described in the context of an exemplar industrial control system 10. The industrial control system 10 may include a programmable logic controller ("PLC") 12 with a locally accessible Human Machine Interface ("HMI") or computer terminal 14 having a keyboard, mouse and a display. The PLC 12 can communicate via a control network with a variable frequency drive ("VFD") unit 16. The drive unit 16 has access to a power source and utilizes a transistor network (not shown) to deliver three phase electric power to a motor 20 via a combined power and communications cable 22. The drive unit 16 also bi-directionally communicates data with the motor 20 via cable 22.

The cable 22 includes first, second and third insulated conductors 24, 26 and 28, respectively, for delivering the three phase electric power to the motor 20. The cable 22 also includes fourth and fifth insulated conductors 30 and 32, respectively, for low voltage (lower than the first, second and third insulated conductors 24, 26 and 28, respectively) data communications with the motor 20. The cable 22 also includes a sixth insulated conductor 34 for delivering a protective ground to the motor 20. The cable 22 may also optionally include seventh and eighth insulated conductors 36 and 38, respectively, for additional control over the motor 20. The cable 22 can connect to the drive unit 16 at a single drive unit connector 40, and connects to the motor 20 at a single motor connector 42, thereby electrically and mechanically coupling the drive unit 16 to the motor 20. In another aspect, multiple cables 22 can be connected serially with connectors in between (not shown).

The motor 20 can comprise a stator with electrical windings 44 which are placed around a rotor 46 with magnets. The motor 20, receiving the power from the drive unit 16, feeds the power into the electrical windings 44, which, in turn, electromagnetically interacts with the rotor 46 with magnets, creating a mechanical force to thereby rotate the motor. As a result, the rotor 46 rotates a shaft 48, which can affect a variety of motions in the industrial process (not shown). Depending on how power is applied to the electrical windings 44, the shaft 48 can be moved and stopped at precise positions, in clockwise or counter-clockwise directions, and can be moved at continuous or varying speeds.

The motor 20 can also comprise an encoder 50 which can precisely measure (or sense) position of the shaft 48 via a detection plate 52, or which can communicate with one or more other intelligent sensors or devices 54 integrated within the motor, such as one or more temperature sensors and/or timers. The encoder 50 can then communicate such information to the drive unit 16 via the fourth and fifth insulated conductors 30 and 32. The encoder 50 can also receive communications from the drive unit 16 via the fourth and fifth insulated conductors 30 and 32 to effect such operations as the motor can be configured to allow. In an alternative aspect, the motor 20 can include additional signal conditioning and/or logic, for example, which can act on the electrical power delivery to the motor for exercising control over such aspects as precisely moving the motor in either direction.

The motor 20 can also optionally comprise a solenoid actuated brake 58, which is attached to shaft 48 and is designed to lock in place when controlled to do so, allowing for motor service and braking. The solenoid actuated brake 58 can receive a low voltage (lower than the first, second and third insulated conductors 24, 26 and 28, respectively, for delivering the three phase electric power) communication trot the drive unit 16 via the seventh and eighth insulated conductors 36 and 38, respectively to apply a brake to stop the motor, such as during an emergency.

Figure 2:
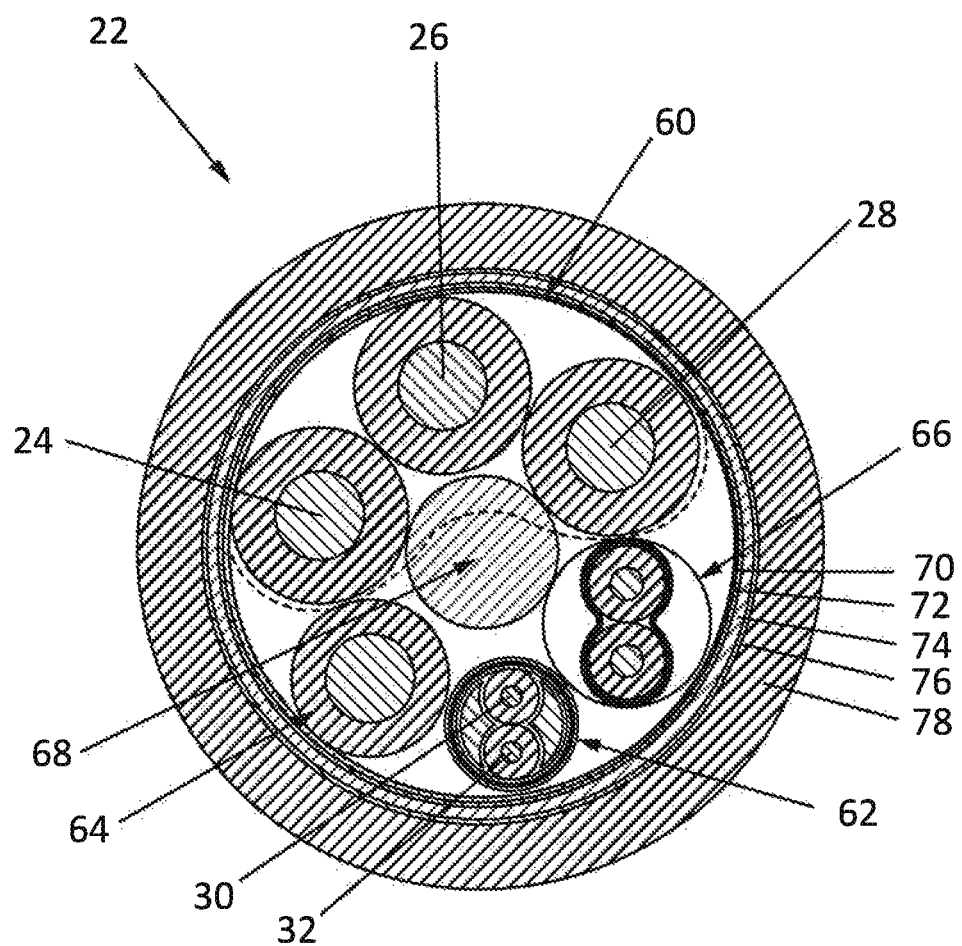
FIG. 2 is a cross-sectional view of a combined power and communications cable which can be used in the system of FIG. 1 in accordance with an aspect of the invention.
Figure 5:
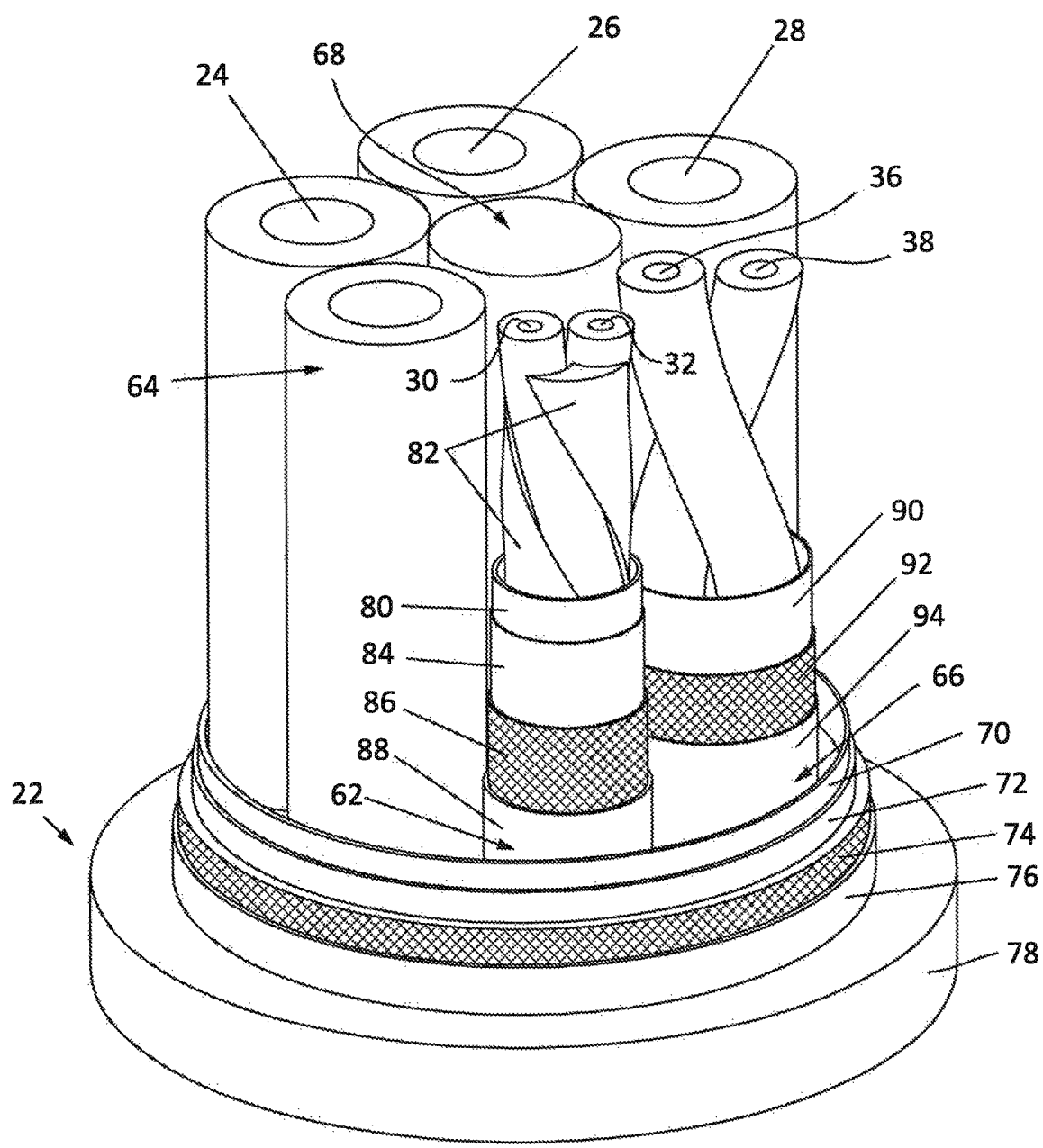
FIG. 5 is an isometric view of the combined power and communications cable of FIG. 2.

Referring now to FIGS. 2 and 5, cross-sectional and isometric views, respectively, of the cable 22 are shown in accordance with an aspect of the invention. The first, second and third insulated conductors 24, 26 and 28, respectively, for delivering three phase electric power and having high voltage relative to the communications signals are provided in a first group 60 (a power delivery group). The low voltage fourth and fifth insulated conductors 30 and 32, respectively, for data communication are separately provided in a second group 62 (a data communications group) (see FIG. 3). Each insulated conductor can comprise, for example, a copper conductor core surrounded by an electrically insulating jacket having a low dielectric constant.

Third and fourth groups 64 and 66 (separation groups), respectively, are placed on opposing sides of the second group 62 (the data communications group). Accordingly, one separation group (such as the third group 64) is placed between the second group 62 (the data communications group) and the first group 60 (the power delivery group) on one side; and another separation group (such as the fourth group 66) is placed between the second group 62 (the data communications group) and the first group 60 (the power delivery group) on an opposing side, around a common center 68. The third and fourth groups 64 and 66 (separation groups), respectively, can have rounded insulated cross-sections, and the third and fourth groups 64 and 66 groups, respectively, can each preferably include at least one insulated conductor. In one aspect, the third group 64 can comprise a sixth insulated conductor for delivering a protective ground, and the fourth group 66 can comprise seventh and eighth insulated conductors 36 and 38, respectively, for providing motor brake control (optional motor control brake subassembly) (see FIG. 4). The first, second, third and fourth groups 60, 62, 64 and 66, respectively, can then be twisted together around the common center 68. The common center 68 can be a solid filler having a rounded cross-section, though in alternative aspects, the common center can be a fibrillated and/or pliable material and can have a low dielectric.

In one aspect, the fourth and fifth insulated conductors 30 and 32, respectively, in the second group 62, providing low voltage communication signals, can each have a greater wire gauge than any of the first, second and third insulated conductors 24, 26 and 28, respectively, in the first group 60, delivering the three phase electric power. Moreover, the fourth and fifth insulated conductors 30 and 32, respectively, can each have a greater wire gauge than any of the seventh and eighth insulated conductors 36 and 38, respectively, in the fourth group 66, providing motor brake control. The sixth insulated conductor in the third group 64, delivering the protective ground, can have a wire gauge equivalent to any of the first, second and third insulated conductors 24, 26 and 28, respectively, in the first group 60. In a preferred aspect, the fourth and fifth insulated conductors 30 and 32, respectively, in the second group 62 can have an American Wire Gauge (AWG) rating of 22 or more, and the first, second and third insulated conductors 24, 26 and 28, respectively, in the first group 60, and the sixth insulated conductor in the third group 64, can each have an AWG rating of 18 or less.

The twisted together first, second, third and fourth groups 60, 62, 64 and 66, respectively, can be covered in one or more layers to achieve various effects. In one aspect, the first, second, third and fourth groups 60, 62, 64 and 66, respectively, can be covered by a core wrap 70, which can be, for example, a Polyester or Polypropylene (PP) tape, Nylon binder or similar material allowing some flexibility and movement of the first, second, third and fourth groups 60, 62, 64 and 66, respectively. The core wrap 70 can optionally contain filler (not shown), such as PP, for substantially maintaining a round geometric shape of the cable 22. The core wrap 70, in turn, can be covered by a metallic tape 72 or foil (electrical screen), which can be aluminized, so as to attenuate high frequency electrical noise. The metallic tape 72 can be applied in a manner so as to provide sufficient overlap resulting in complete coverage. The metallic tape 72, in turn, can be covered by an electrical shield 74. The electrical shield 74 can be a braided copper shield used to minimize Electromagnetic Interference (EMI). The electrical shield 74, in turn, can be covered by a low friction tape 76 (flex assist) which can allow movement between the inner cable body and a cable jacket. The low friction tape 76, in turn, can be covered by a cable jacket 78, which can be, for example, a Thermoplastic Elastomer (TPE) or Polyvinylchloride (PVC) material extruded over the cable core for protecting the cable 22. The material and thickness of the cable jacket 78 can be determined by regulatory demands and can provide physical protection from the elements and improved durability. It will be appreciated that the above ordering of the one or more layers can be varied, and that certain layers can be excluded while other layers are included, to achieve various effects as desired.

Figure 3:
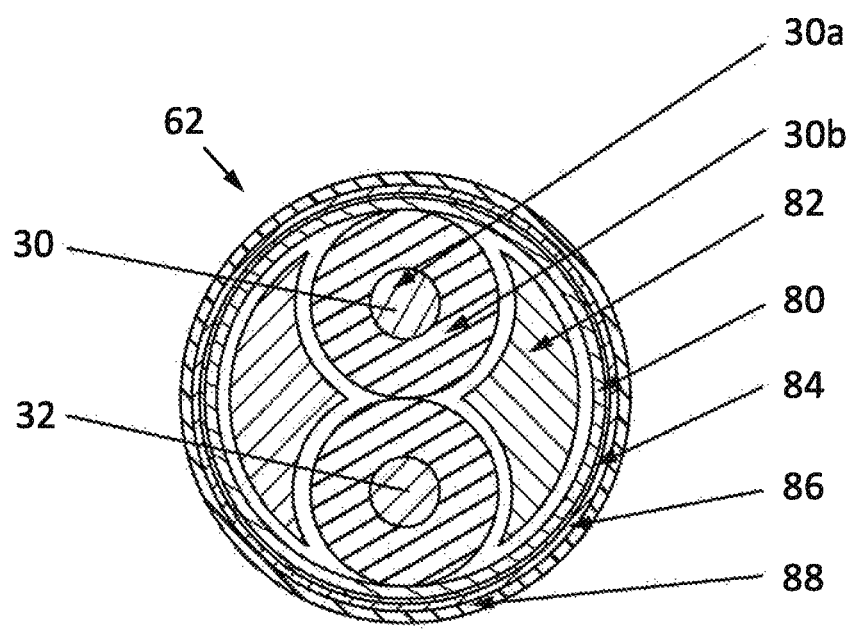
FIG. 3 is a cross-sectional view of a communications subassembly of the cable of FIG. 2.

With additional reference to FIG. 3, the fourth and fifth insulated conductors 30 and 32, respectively, forming the second group 62 for data communication (communications subassembly), are twisted together around a common center and can also be covered by one or more communications subassembly layers to achieve various effects. By way of example, as highlighted in FIG. 3, the fourth insulated conductor 30, like other insulated conductors in the cable 22, can include a conductor portion 30a, which can be copper, and an electrical insulator portion 30b surrounding the conductor portion 30a. In one aspect, the fourth and fifth insulated conductors 30 and 32, respectively, can be covered by a tape wrap 80 with a filler 82 contained beneath the tape wrap 80. The filler 82, which can be PP for example, can be applied for substantially maintaining the round geometric shape of the twisted fourth and fifth insulated conductors 30 and 32, respectively, thereby further minimizing noise and interference onto the communication signals by ensuring improved impedance matching to electronics in the encoder and in the drive unit. The filler 82 essentially fills the valleys that result from twisting together the fourth and fifth insulated conductors 30 and 32, respectively. The density of the filler 82 can be controlled to ensure overall roundness of the twisted, shielded insulated conductors, which results in improved transmission line characteristics. The tape wrap 80, in turn, can be covered by a metallic tape 84 or foil (electrical screen), which can be aluminized, so as to attenuate high frequency electrical noise. The metallic tape 84 can be applied in a manner so as to provide sufficient overlap resulting in complete coverage. The metallic tape 84, in turn, can be covered by an electrical shield 86. The electrical shield 86 can be a braided copper shield used to minimize EMI. The electrical shield 86, in turn, can be covered by a cable jacket 88, which can be, for example, a TPE or PVC material extruded over the communications subassembly core for protecting the second group 62. It will be appreciated that the above ordering of the one or more communications subassembly layers can be varied, and that certain layers can be excluded while other layers are included, to achieve various effects as desired.

Figure 4:
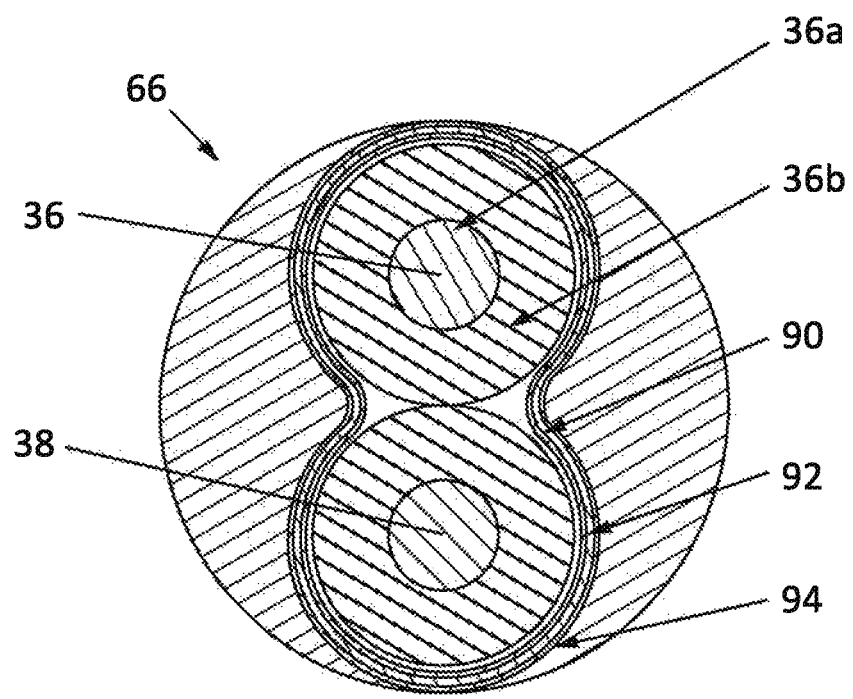
FIG. 4 is a cross-sectional view of an optional motor control brake subassembly of the cable of FIG. 2.

With additional reference to FIG. 4, the fourth group 66 can comprise seventh and eighth insulated conductors 36 and 38, respectively, for providing motor brake control (optional motor control brake subassembly). The seventh and eighth insulated conductors 36 and 38, respectively, can be twisted together around a common center and can be covered by one or more motor control brake subassembly layers to achieve various effects. By way of example, as highlighted in FIG. 4, the seventh insulated conductor 36, like other insulated conductors in the cable 22, can include a conductor portion 36a, which can be copper, and an electrical insulator portion 36b surrounding the conductor portion 36a. In one aspect, the seventh and eighth insulated conductors 36 and 38, respectively, can be covered by a metallic tape 90 or foil (electrical screen), which can be aluminized, so as to attenuate high frequency electrical noise. The metallic tape 90 can be applied in a manner so as to provide sufficient overlap resulting in complete coverage. The metallic tape 90, in turn, can be covered by an electrical shield 92. The electrical shield 92 can be a braided copper shield used to minimize EMI. The electrical shield 92, in turn, can be covered by a tape wrap 94 for containing the motor control brake subassembly. The fourth group 66, as twisted together, can project through the cable 22 in a round geometric shape. It will be appreciated that the above ordering of the one or more motor control brake subassembly layers can be varied, and that certain layers can be excluded while other layers are included, to achieve various effects as desired.

Accordingly, the cable 22 can have a reduced cross section while providing high voltage (noisy) power signals via the first, second and third insulated conductors 24, 26 and 28, respectively, for delivering three phase electric power in the first group 60, alongside low voltage (noise-susceptible) data signals, via the fourth and fifth insulated conductors 30 and 32, respectively, for data communication in the second group 62. The reduced cross section advantageously improves handling. By providing the third and fourth groups 64 and 66, respectively, as separation groups between the first group 60 delivering power and the second group 62 providing communications, thereby enforcing a physical separation, and by twisting together individual conductors of the first group 60 delivering the power with the second group 62 providing the communications and the third and fourth groups 64 and 66, respectively, providing the separation, the reduced cross section can be achieved while continuing to minimize noise and interference onto the data signals of the second group 62 due to the power signals of the first group 60.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An electrical cable comprising:
   a plurality of insulated power conductors for delivering electric power;
   at least one insulated data conductor for providing data communication; and
   first and second separation structures,
   wherein the power conductors, the data conductor and the separation structures are twisted together around a common center and covered by an electrical shield, and
   wherein the first separation structure is arranged between the data conductor and the power conductors on a first side of the power conductors and the second separation structure is arranged between the data conductor and the power conductors on a second side of the power conductors.

2. The cable of claim 1, wherein power conductors comprise first, second and third power conductors for delivering three phase electric power.

3. The cable of claim 1, wherein the electrical shield is a first electrical shield and the data conductor is a first data conductor, and further comprising a second data conductor, wherein the first and second data conductors are twisted together and covered by a second electrical shield.

4. The cable of claim 1, wherein the first separation structure comprises an insulated ground conductor for delivering a protective ground.

5. The cable of claim 4, wherein the second separation structure comprises at least one insulated control conductor for providing motor control.

6. The cable of claim 5, wherein the electrical shield is a first electrical shield and the control conductor is a first control conductor, and further comprising a second control conductor, wherein the first and second control conductors are twisted together and covered by a second electrical shield.

7. The cable of claim 1, wherein the common center is a filler to maintain a round shape.

8. The cable of claim 1, wherein the separation structures each have rounded cross-sections.

9. The cable of claim 1, wherein the electrical shield is a braided shield, and further comprising the power conductors, the data conductor and the separation structures being covered by a metallic tape interior to the braided shield.

10. The cable of claim 9, further comprising the braided shield being covered by a cable jacket.

11. The cable of claim 10, further comprising a low friction tape between the braided shield and the cable jacket.

12. The cable of claim 1, wherein the data conductor as a smaller cross section and the power conductors each have a larger cross section.

13. A method for combining power and communications in an electrical cable, the method comprising:
    providing a plurality of insulated power conductors for delivering electric power;
    providing at least one insulated data conductor for providing data communication;
    providing first and second separation structures;
    twisting together the power conductors, the data conductor and the separation structures around a common center, wherein the first separation structure is arranged between the data conductor and the power conductors on a first side of the power conductors and the second separation structure is arranged between the data conductor and the power conductors on a second side of the power conductors; and
    covering the power conductors, the data conductor and the separation structures by an electrical shield.

14. The method of claim 13, wherein the electrical shield is a first electrical shield and the data conductor is a first data conductor, and further comprising twisting together the first data conductor and a second data conductor and covering the first and second data conductors by a second electrical shield.

15. The method of claim 13, wherein the electrical shield is a braided shield, and further comprising the power conductors, the data conductor and the separation structures being covered by a metallic tape interior to the braided shield.

16. The method of claim 13, wherein the common center and the separation structures each have rounded cross-sections.

17. The method of claim 13, wherein the data conductor has a smaller cross section and the power conductors each have a larger cross section.

18. An industrial control system comprising:
    a motor powered by multi-phase electric power and having an encoder;
    a drive unit for delivering multi-phase electric power to the motor and for communicating with the encoder; and
    a combined power and communications cable coupling the motor and the drive unit, comprising:
    first, second and third insulated power conductors for delivering the multi-phase electric power;
    at least one insulated data conductor for providing data communication; and
    first and second separation structures,
    wherein the power conductors, the data conductor and the separation structures are twisted together around a common center and covered by an electrical shield, and
    wherein the first separation structure is arranged between the data conductor and the power conductors on a first side of the power conductors and the second separation structure is arranged between the data conductor and the power conductors on a second side of the power conductors.

19. The industrial control system of claim 18, wherein the electrical shield is a first electrical shield and the data conductor is a first data conductor, and further comprising a second data conductor, wherein the first and second data conductors are twisted together and covered by a second electrical shield.

20. The industrial control system of claim 19, wherein a separation structure comprises at least one insulated control conductor for providing brake control for the motor.

* * * * *